Patented Mar. 11, 1941

2,234,692

UNITED STATES PATENT OFFICE 2,234,692

PROCESS OF MAKING P-NITROSOPHENOL

Thomas S. Donovan and Lewis J. Behrndt, Rochester, N. Y., assignors to Eastman Kodak Company, Rochester, N. Y., a corporation of New Jersey No Drawing. Application October 31, 1939, Serial No. 302,260

5 Claims. (Cl. 260—621)

This invention deals with the manufacture of p-nitrosophenol, and more particularly with a process wherein an excellent yield of p-nitrosophenol is obtained at decreased expense.

It is known that p-nitrosophenol, $HO \cdot C_6H_4 \cdot NO$ or $O:C_6H_4:N.OH$, can be manufactured by the reaction of sulfuric acid upon an aqueous solution of sodium nitrite, alkali and phenol. It has also been known that the yield could be increased by using a large excess of sodium nitrite. For instance, M. Nevrev and E. Malevinskaya, in Anilinokrasochnaya prom. 5, 220–7 (1935) (Chemical Abstracts 30, 7107 (1936)) state that the yield can be increased by using a 53% excess of sodium nitrite, while Chao-Lun Tseng and Mei Hu, in the J. Chinese Chem. Soc. 1, 183–7 (1933) (Chemical Abstracts 28, 1680 (1934)) obtained a 90% yield of p-nitrosophenol by using 200 g. of potassium nitrite, a 344% excess, per 50 g. of phenol. The natural assumption is that the increase in yield is brought about in accordance with the law of mass action or molecular concentration, the increased concentration of one of the reagents (sodium or potassium nitrite) being the cause of the increased yield.

We have found, however, that the increase in yield of p-nitrosophenol in the presence of a large excess of sodium nitrite is actually due to a salting-out effect, and that the same result can be obtained by adding, instead of a large excess of sodium nitrite, an additional quantity of sodium acid sulfate, one of the products of the reaction.

As an illustrative example, by which we are not to be limited, we may use the following proportions of compounds in carrying out our invention:

Solution A

| | Grams |
|---|---|
| Phenol | 94.0 |
| Sodium nitrite (10% excess) | 76.0 |
| 40% caustic soda | 30.0 |
| Water | 1570.0 |

Solution B

| | Grams |
|---|---|
| 66° Bé. sulfuric acid | 90.0 |
| Sodium acid sulfate | 85.0 |
| Water | 715.0 |

It will be understood that we may use potassium acid sulfate instead of sodium acid sulfate, but the reduction in cost would not be so marked.

We may also use sodium or potassium sulfate in place of the acid sulfate. In carrying out this form of our invention, we may, for example, use the following proportions:

Solution 1

| | Grams |
|---|---|
| Phenol | 94.0 |
| Sodium nitrite (10% excess) | 76.0 |
| 40% caustic soda | 30.0 |
| Anhydrous sodium sulfate | 15.0 |
| Water | 1570.0 |

Solution 2

| | Grams |
|---|---|
| 66° Bé. sulfuric acid | 105.0 |
| Water | 715.0 |

If hydrated sodium sulfate is used, allowance should be made for the water of crystallization.

What we claim as our invention and desire to be secured by Letters Patent of the United States is:

1. In a process of manufacturing p-nitrosophenol from phenol, an alkali metal nitrite, and sulfuric acid, the step of adding to the reaction mixture a compound selected from the group consisting of alkali metal acid sulfates and alkali metal sulfates, whereby the yield of p-nitrosophenol is increased without the use of a large excess of alkali metal nitrite.

2. In a process of manufacturing p-nitrosophenol from phenol, an alkali metal nitrite, and sulfuric acid, the step of adding an alkali metal acid sulfate to the reaction mixture, whereby the yield of p-nitrosophenol is increased without the use of a large excess of alkali metal nitrite.

3. In a process of manufacturing p-nitrosophenol from phenol, an alkali metal nitrite, and sulfuric acid, the step of adding an alkali metal sulfate to the reaction mixture, whereby the yield of p-nitrosophenol is increased without the use of a large excess of alkali metal nitrite.

4. In a process of manufacturing p-nitrosophenol from phenol, an alkali metal nitrite, and sulfuric acid, the step of adding sodium acid sulfate to the reaction mixture, whereby the yield of p-nitrosophenol is increased without the use of a large excess of alkali metal nitrite.

5. In a process of manufacturing p-nitrosophenol from phenol, an alkali metal nitrite, and sulfuric acid, the step of adding sodium sulfate to the reaction mixture, whereby the yield of p-nitrosophenol is increased without the use of a large excess of alkali metal nitrite.

THOMAS S. DONOVAN.
LEWIS J. BEHRNDT.